United States Patent [19]

Harmony

[11] 4,132,364

[45] Jan. 2, 1979

[54] CASING MOUNTED EMITTER

[75] Inventor: Richard C. Harmony, Tucson, Ariz.

[73] Assignee: Harmony Emitter Company, Inc., Tucson, Ariz.

[21] Appl. No.: 716,441

[22] Filed: Aug. 23, 1976

[51] Int. Cl.² ............................................. B05B 15/02
[52] U.S. Cl. .................................. 239/542; 239/271; 239/533.13; 138/45
[58] Field of Search ................. 239/107, 271, 533.13, 239/542, 550, 551; 138/43, 45, 46; 285/DIG. 22, 162, 331

[56] References Cited

U.S. PATENT DOCUMENTS

| | | | |
|---|---|---|---|
| Re. 29,022 | 11/1976 | Spencer | 239/107 X |
| 2,437,933 | 3/1948 | Brennan | 285/331 X |
| 3,606,166 | 9/1971 | Whear | 239/542 X |
| 3,779,468 | 12/1973 | Spencer | 239/107 X |
| 3,814,377 | 6/1974 | Todd | 239/542 X |
| 3,885,743 | 5/1975 | Wake | 239/542 |
| 3,899,136 | 8/1975 | Harmony | 239/542 X |
| 3,918,646 | 11/1975 | Leal-Diaz et al. | 239/542 X |
| 3,970,251 | 7/1976 | Harmony | 239/542 X |

*Primary Examiner*—Robert W. Saifer
*Attorney, Agent, or Firm*—Cahill, Sutton & Thomas

[57] ABSTRACT

A casing mounted miniaturized emitter, penetratingly lodged within an orifice in the wall of a conduit containing fluid to be dispensed, emits the fluid at a constant output flow rate irrespective of the fluid pressure within the conduit. A pair of spaced apart annular flanges disposed about the casing define an annular channel for retainingly engaging the orifice in the wall of the conduit. An insert having a pair of downwardly depending flexible skirts with striae disposed on facing surfaces of the skirts is supported by the casing. The pair of skirts, in combination with the extent pressure on opposing sides of the skirts, regulate the size of the passageway through the emitter to maintain a constant rate of output fluid flow irrespective of fluid pressure variations within the conduit.

12 Claims, 8 Drawing Figures

CASING MOUNTED EMITTER

The present application is related to a patent application entitled "Penetrably Mounted Emitter for Conduits", filed May 26, 1976, and assigned Ser. No. 690,168, now U.S. Pat. No. 4,077,570, a patent application entitled "Fluid Flow Regulator", filed Aug. 13, 1975, and assigned Ser. No. 604,146, now U.S. Pat. No. 3,993,248, a patent application entitled "Pipe Insertable Emitter for Irrigation Systems", filed Mar. 6, 1975, and assigned Ser. No. 555,945, now U.S. Pat. No. 3,970,251, a U.S. Pat. No. 3,917,169, issued Nov. 4, 1975, entitled "Emitter for Irrigation Systems", which patent is a continuation-in-part of U.S. Pat. No. 3,899,136, issued Aug. 12, 1975, entitled "Emitter for Irrigation Systems"; all of the above patents and applications therefor describe inventions made by the present invention and assigned to the present assignee.

The present invention relates to fluid dispensing apparatus and, more particularly, to a miniaturized emitter mounted upon a conduit containing fluid under high pressure, which emitter dispenses the fluid at a constant flow rate regardless of fluid pressure variations within the conduit.

Irrigation devices of various types have been available for a number of years. These devices may generally be classified in one of two categories: those intended for home use and those intended for industrial applications.

The devices intended for home use are usually attachable to a standard water hose and include a multiport pressure reducing chamber. The water outflow is at a sufficiently low rate so as not to erode the soil about the plant roots. The rate of water flow is, however, dependent upon the water pressure within the water hose. Therefore, some judgment must be exercised in controlling the water flow through the water hose. The problem is exacerbated where a plurality of devices are attached to a common water hose.

Where clean water is used, such as available from a municipal water system, no clogging problems usually develop; however, if the water contains particulate matter of greater than microscopic size, such as might occur from unfiltered water obtained from wells, one or more ports within the device(s), generally become clogged. The clogging causes a resulting increase in the rate of water flow through the remaining ports. The force of the increased water flow can and often does cause erosion of the adjacent soil. Moreover, clogging of several ports may sufficiently restrict the volume of water output from one or more devices. In addition, the devices with the reduced water output will effect the rate of water flow through the remaining devices.

Irrigation devices intended for industrial use are generally connected to a source of irrigation water, that is, water which does contain suspended particulate matter. To overcome the clogging effects of the particulate matter, the outlet ports in these devices are generally of resilient material to permit them to expand as necessary to pass the particulate matter. Where a port expands to pass the particulate matter, the rate of water flow therethrough simultaneously increases. The increased water flow tends to reduce the water pressure within the common envelope feeding the devices and results in a reduction of water through the remaining devices. Thereby, uneven irrigation often results. Due to aging, the resilient material may not be able to contract to its initial size and thereby may contribute to an uneven rate of water discharge.

Where a plurality of non-self regulating water discharge devices or ports are disposed along a length of hose, a substantial pressure gradient exists through the length of the hose. The pressure gradient, in turn, tends to cause a porportional water flow output from the devices or their ports. Such variation in water flow results in non-uniform irrigation along the length of the hose.

The following patents are representative of the state of the art in irrigation devices and soakers: U.S. Pat. Nos. 1,366,685; 2,543,775; 2,775,984; 2,851,306; 2,961,109; 3,084,334; 3,116,019; 3,221,996; 3,308,800; 3,546,884; 3,552,654; 3,667,685; 3,685,735; 3,693,888; 3,698,195; 3,767,124; 3,777,980; 3,777,987; 3,779,468; 3,780,946; 3,788,544; 3,797,741; 3,797,754; 3,814,377 and 3,899,136.

Because of the nature of the above described devices, their application has been generally limited to that of fruit bearing bushes and trees and other plants which need not be replanted seasonally. For seasonal and machine harvested plants, such as various grains, vegetables and fruits, the labor costs attendant the laying out and retrieval of the above described devices generally precludes them from being practical for irrigation purposes. For such crops, irrigation devices must be capable of being laid and retrieved by machine or they must be sufficiently inexpensive to permit discarding them at the conclusion of the growing season.

When one is considering employment of emitters for irrigation of large fields, the size of the emitters to be used becomes a serious consideration because of related storage and handling problems. Furthermore, to maintain low labor costs, the emitters must be readily and easily mountable upon or within the fluid conveying conduits. Should the emitters be mounted upon the conduits prior to laying the conduits on or beneath the surface of the ground, the additional bulk necessitated by the attached emitters must be sufficiently minimized to permit normal handling of the conduit or else the related storage and handling requirements may be of sufficient magnitude to negate effective commercial deployment of the emitters.

In the above identified patent application assigned to the present assignee, entitled "Penetrably Mounted Emitter for Conduits", the described emitter is a one piece unit molded from flexible material. The material has, of course, a certain degree of elasticity which will permit it to temporarily deform under the influence of a force acting thereupon. Hence, under the urging of sufficient force, the emitter may temporarily deform sufficiently to render ineffective the retention means of the emitter which maintain it mounted within the wall of the conduit. Where this force created by the fluid pressure within the conduit, the emitter might be ejected from the conduit resulting in an unregulated flow of fluid from the remaining aperture within the wall of the conduit. By tests, it has been determined that such ejection may occur if the pressure of the fluid within the conduit is in the range of thirty to forty psi. For long runs of conduit wherein losses due to fluid flow friction within the conduit dictate fluid input at high pressure levels, the constant flow regulating emitters must be capable of continuing satisfactory operation within high pressure environments.

It is therefore a primary object of the present invention to provide a miniaturized emitter which discharges fluid under high pressure at a constant rate despite variations in the fluid pressure. Another object of the present invention is to provide an emitter penetrably mountable in situ within the wall of a fluid conveying conduit.

Yet another object of the present invention is to provide a conduit mounted emitter which will remain in place at least until rupture of the conduit due to high fluid pressure within the conduit.

Still another object of the present invention is to provide a manually insertable emitter penetratingly mounted within the wall of a fluid conveying conduit.

A further object of the present invention is to provide an emitter for use in high pressure environments, which emitter is self purging during initiation and cessation of fluid flow therethrough.

A yet further object of the present invention is to provide a high pressure emitter which will pass fluid suspended particulate matter.

A still further object of the present invention is to provide a conduit mounted high pressure emitter which defines an insufficiently rigid protrusion from the conduit to preclude storage of the conduit with the emitters mounted thereon.

A still further object of the present invention is to provide a conduit mounted emitter having means for attaching tubing thereto to convey fluid from the conduit to a distant location at a constant flow rate despite pressure variations within the conduit.

These and other objects of the present invention will become apparent to those skilled in the art as the description thereof proceeds.

The present invention may be described with greater specificity and clarity with reference to the following drawings, in which.

Figure 1:
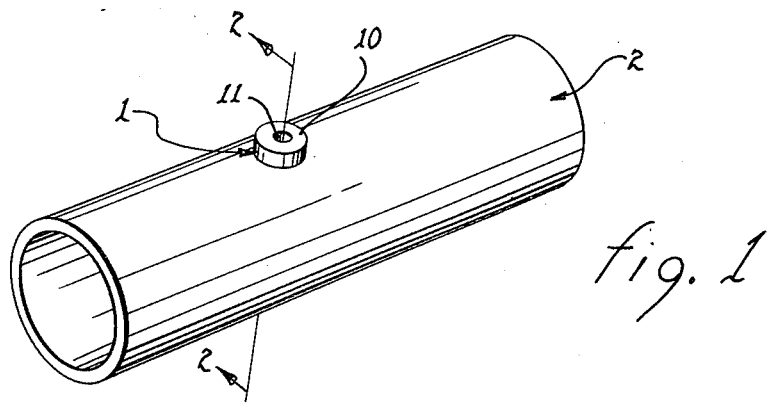
FIG. 1 illustrates an emitter penetrably mounted within the wall of a fluid conveying conduit.
Figure 2:
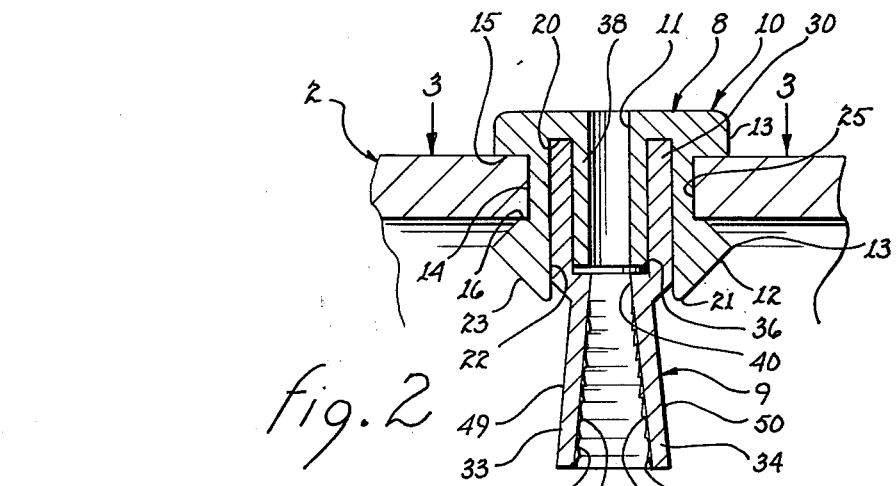
FIG. 2 is a cross-section of the emitter illustrated in FIG. 1 and taken along lines 2—2.

An emitter 1, constructed in accordance with the teachings of the present invention, is penetrably mounted within the wall of a conduit 2, as illustrated in FIG. 1. As is evident from the drawing, protruding head 10 of the emitter is relatively small sized and includes a centrally located discharge outlet 11. Although emitter 1 is depicted as being mounted upon the uppermost part of the conduit, the circumferential position of the emitter about the conduit has no effect upon either the operability of the emitter nor upon the rate of fluid flow through the emitter, as will be explained in further detail below. The conduit itself may be of flexible or semi-rigid material, such as any one of the many man-made plastic materials. The only constriction upon the selection of material for the conduit is that it be somewhat temporarily deformable to accommodate penetrating mounting of the emitter.

The structural details of cap 8 and insert 9 forming emitter 1 will be described with primary reference to FIGS. 2, 3, 4 and 5. The cap is symmetric about its longitudinal axis extending through the center of the discharge outlet. The protruding part (head 10) is disc-shaped and discharge outlet 11 represents a cylindrical cavity centered upon the longitudinal axis. A downward opening annular cavity 20 is disposed within cap 8 concentric with discharge outlet 11. An annular flange 12, generally triangular in cross-section and including a circumscribing apex 13, is longitudinally segregated from disc-like head 10 by an annular channel 14. Walls 15 and 16 define the radial sides of the head and the annular flange, respectively. The sloping cone-like side 23 of the annular flange extends from apex 13 to edge 21, which edge is coincident with wall 22 of cavity 20. By inspection, it becomes apparent that the diameter of ring-like edge 21 is less than the diameter of channel 14 while the diameter of apex 13 is substantially greater than the diameter of the channel.

As illustrated, cap 8 is mountable within the wall of conduit 2 in the following manner. An aperture 25 is punched or otherwise formed within the wall of conduit 2; the aperture being preferably of a lesser diameter than the diameter of channel 14 to establish a sealed fit intermediate the conduit and the cap. To aid in penetrating insertion of cap 8 through aperture 25, the diameter of edge 21 is preferably of lesser diameter than that of the aperture. On insertion of the cap, the lower extremity of annular flange 12 is inserted within aperture 21 and the applied force acting through cone-like side 23 expands aperture 25 to accommodate passage therethrough of apex 13 until the conduit wall can contract into a sealed relationship within channel 14. Wall 16 of the annular flange, being essentially planar with the inner wall of conduit 2, tends to restrain expulsion of the cap due to pressure from within the conduit or a pulling force from without the conduit.

Insert 9 is formed of elastic flexible material having a good "memory", such as silicone or a composition of silicone and kraton. The insert is molded as a single unit formed with a cylindrically shaped shroud 30 and a pair of skirts 33 and 34 depending therefrom. The wall thickness, diameter and length of shroud 30 is configured compatible with cavity 20 to permit insertion and retention of the shroud within the cavity. A circular seat 36 is formed interior of shroud 30 to bear against cylindrically shaped element 38 depending from head 10 intermediate discharge outlet 11 and cavity 20.

Skirts 33 and 34 define a passageway for the flow of fluid from within conduit 2 to discharge outlet 11 through an orifice 40 formed at the upper extremity of the skirts. Lateral edges 43 and 44 of skirts 33 and 34, respectively, are smooth surfaced and the upper parts thereof are positioned adjacent one another. The lower extremities of the skirts extend downwardly in a diverging relationship. Convergence of the skirts, beyond a predetermined amount, is restrained by seat 36 bearing against the lower edge of cylindrically shaped element 38. The cross-sectional configuration of the skirts, in the horizontal plane, may be planar or may define a U-shape, as described in further detail in the above identified U.S. patent application entitled "Penetrably Mounted Emitter for Conduits". One or both of skirt surfaces facing one another may be striated with striae 47 and 48, respectively. The outer surfaces 49 and 50 of the skirts may be planar, striated or embossed, the configuration of which has no appreciable effect upon the operation of the emitter.

In operation, the insert and lower portion of the cap forming emitter 1 is penetrably inserted through aperture 25 within the wall of conduit 2 until the inner surface of the aperture rests within channel 14. In this position, side wall 16 of flange 12 adjacent the interior surface of the conduit will resist ejection of the emitter despite the normally expected pressure exerted by a fluid within conduit 2. Moreover, the lateral expansion of flange 12 necessitating forced enlargement of aperture 25 will further restrain expulsion of the emitter if the retaining effect of wall 16 is insufficient. Similarly, side wall 15 of head 10 will inhibit complete insertion of the emitter into the conduit through aperture 25.

The fluid under pressure within conduit 2 will flow intermediate skirts 33 and 34 into the passageway defined by striae 47 and 48 and discharge through orifice 40 into discharge outlet 11. The striae, whether on one or both of surfaces 30, 31 will turbulate the fluid flow therebetween. The turbulated fluid flow will establish a fluid pressure gradient from the lower edges of the skirts to orifice 40. Simultaneously, the fluid within conduit 2 will exert pressure upon outer surfaces 49 and 50 of skirts 33 and 34, respectively, which pressure forces the skirts toward one another and restrains separation therebetween. Hence, lateral expansion of skirts 33 and 34 produced by the fluid pressure intermediate the skirts is countered by the fluid pressure acting upon the outer surfaces of the skirts. Since the fluid pressure decreases from the lower edges of the skirts to orifice 40 intermediate the skirts due to the pressure gradient and as the pressure adjacent outer surfaces 49 and 50 remains essentially constant therealong, the bias at the upper parts of the skirts will be the most pronounced. The size of orifice 40, being a function of the bias acting upon the skirts, is thereby regulated. That is, the skirts are pressure compensating to regulate the size of the passageway intermediate surfaces 45 and 46 through orifice 40. Thus, the rate of fluid discharge from the emitter is a function of the striated surfaces of skirts 33 and 34 and is independent of the fluid pressure within conduit 2.

As stated above, the interstices between the skirts determine the fluid flow which will occur regardless of the amount of fluid pressure within conduit 2. In example, were the pressure within conduit 2 increased, the higher base level of pressure gradient intermediate skirts 33 and 34 would tend to laterally displace the skirts from one another and thereby expand the passageway. An expanded passageway, would, of course, increase the water flow rate therethrough and through orifice 40 into discharge outlet 11. However, the expansion is inhibited by the simultaneous increase in fluid pressure adjacent outer surfaces 49, 50 of skirts 33 and 34, respectively. The increase of fluid pressure thereon will tend to force surfaces 45 and 46 adjacent one another and restrict fluid flow therebetween. Moreover, the pressure differential between the pressure within the conduit and the reduced pressure established by the pressure gradient in proximity to orifice 40 may possibly compress opposed ridges of the striated surfaces in proximity to the orifice and minimize the size of the interstices inversely proportional to the fluid pressure increase. Were the pressure within the conduit reduced, the bias due to the pressure differential in proximity to orifice 40 would be reduced and the size of the passageway and orifice would be constricted to a lesser extent. Thus, a predetermined and regulated fluid flow will occur through each emitter despite variations in the fluid pressure within conduit 2.

If the fluid within conduit 2 is contaminated by suspended particulate matter, it is quite likely that the particulate matter will be forced intermediate skirts 33 and 34. Should the particulate matter be too large to flow freely through the interstices, it may become lodged intermediate surfaces 45 and 46. Were the particulate matter to become lodged, it would exert a lateral force upon each of skirts 33 and 34 and displace the skirts from one another. The increased displacement would tend to minimize the pressure gradient and result in an increase of the fluid flow rate between the skirts. The resulting fluid flow establishes a force to propell the particulate matter through orifice 40 and discharge outlet 11. Thus, the emitter is non-clogging.

Prior to introduction of fluid into conduit 2 or prior to the establishment of more than a predetermined pressure level within the conduit, skirts 33 and 34, in the relaxed or quiescent configuration, will be positioned apart from one another to define an unobstructed passageway therethrough from interior the conduit into the discharge outlet. This unobstructed passageway will exist until such time as the ambient pressure attendant surfaces 49 and 50 of the skirts, in combination with a co-established partial pressure gradient intermediate surfaces 45 and 46, increases to a predeterminable level of pressure. Upon establishment of a pressure at the predeterminable level, the skirts will flex toward one another from their relaxed state and the fluid flow within the passageway defined therebetween will become restricted in the manner outlined above. Thus, during initial fluid flow through emitter 1, a purging or self-cleaning action occurs which voids the passageway of any existing obstructions or foreign matter. Likewise, on cessation of fluid flow (or tapering off of the fluid pressure) within the conduit, the skirts will flex apart from one another to open the passageway once the pressure has been reduced to the predeterminable level. The open, or unobstructed, passageway will allow purging to occur and the emitter is voided of any existing obstructions or foreign matter on reduction and cessation of fluid pressure within the conduit.

For any given quiescent spacing of skirts 33 and 34, a constant fluid discharge rate therethrough will occur. In order to obtain a different fluid flow discharge rate, the spacing intermediate facing surfaces of the skirts is varied during manufacture of insert 9 or the magnitude of the striae is varied during manufacture or a combination of spacing and striae magnitude may be undertaken. These features are described in further detail in the above referenced U.S. patent application entitled "Penetrably Mounted Emitter for Conduits".

Figure 6:
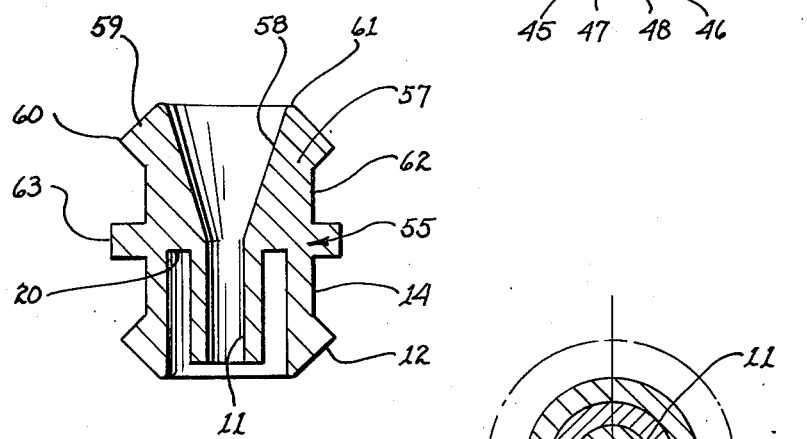
FIG. 6 illustrates a cross-sectional view of a variant of the present invention.
Figure 3:
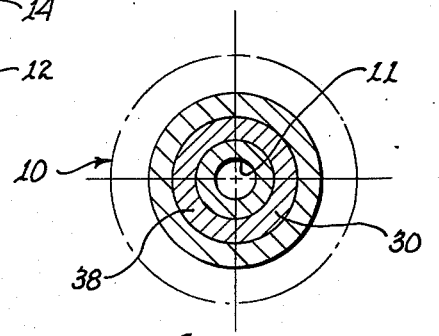
FIG. 3 is a cross-sectional view of the emitter illustrated in FIG. 2 and taken along lines 3—3.
Figure 4:
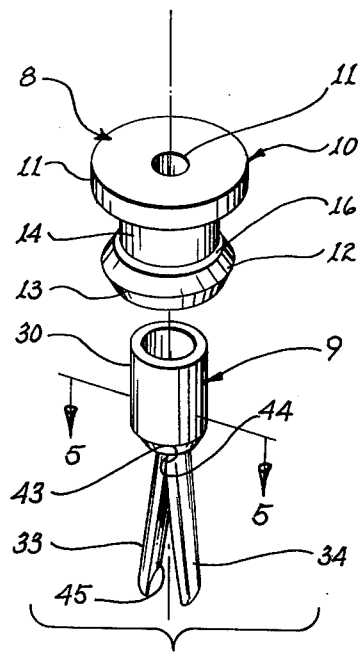
FIG. 4 is an isometric view of the emitter.
Figure 7:
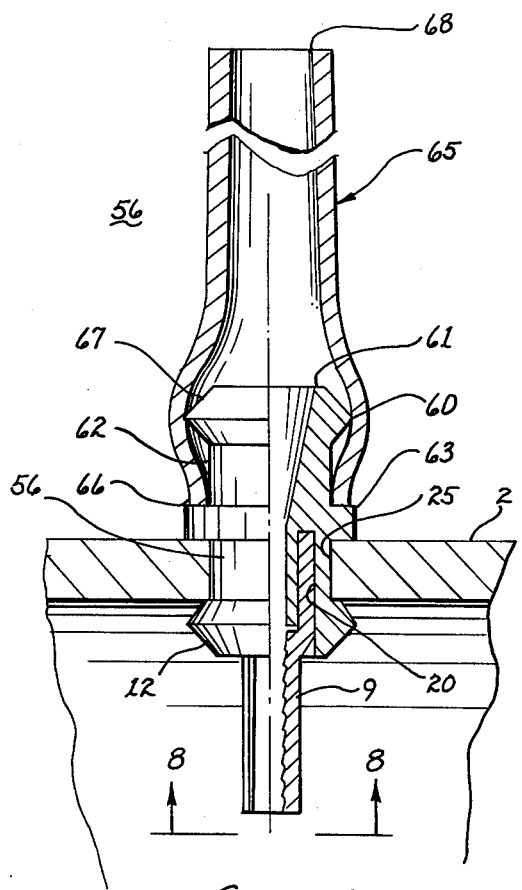
FIG. 7 is a partial cross-sectional view illustrating the variant mounted within a conduit.
Figure 8:
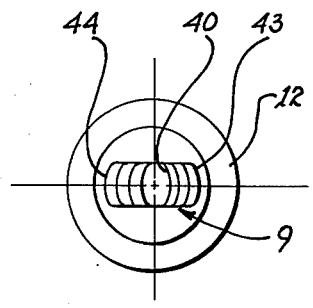
FIG. 8 is a bottom view taken along lines 8—8, as shown in FIG. 7.
Figure 5:
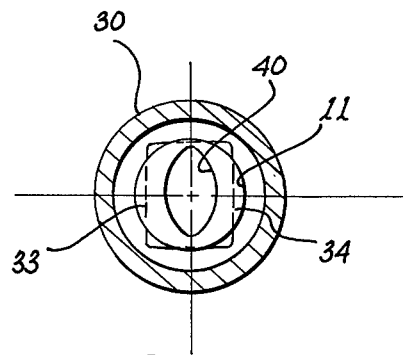
FIG. 5 is a cross-sectional view taken along lines 5—5, as shown in FIG. 4.

For some utilitarian needs, it may be necessary and expedient to discharge a regulated flow of fluid at a point removed from a conduit containing the source of the fluid. The variant of the present invention illustrated in FIGS. 6, 7 and 8 satisfies such utilitarian needs while preserving the capability of providing a regulated fluid flow rate despite pressure variances at the source of the fluid.

Cap 55 of variant 56 includes all of the elements of cap 8 with the addition of an outwardly extending nozzle 57. A cone-shaped (as illustrated) or cylindrically shaped passageway 58 extends through nozzle 57 and interconnects discharge outlet 11 with outlet 61 to provide a continuous path for the fluid flowing through cap 55. A radial flange 59, which is triangular in cross-section and having an apex 60, is disposed in proximity to outlet 61. A channel 62 is developed intermediate flange 59 and disc-like element 63. Element 63 corresponds in general configuration and purpose to head 10 of cap 8 (see FIG. 2).

One end of a length of tubing 65, such as spaghetti tubing, is force fit over nozzle 57. That is, end 66 of the tubing is brought into engagement with cone-like surface 67 of flange 59 disposed intermediate outlet 61 and apex 60. The tubing end will be radially expanded by action of surface 67 until, on transport past apex 60 it can again contract into circumferential engagement with the surface of channel 62. The resulting radial expansion of tubing 65 in proximity to apex 60 will produce not only an effective seal therebetween but also sufficient frictional engagement to secure the tubing to the cap. By inspection, the tubing conveys the fluid received from cap 55 for discharge through outlet 68 at a distant location.

Variant 56 is penetratingly mounted within conduit 2 in the same manner as described above with respect to emitter 1. As particularly illustrated in FIG. 7, after penetration of insert 9, flange 12 is forced through aperture 25 within conduit 2 until the wall of the aperture comes to rest within channel 14 intermediate disc-like element 63 and flange 12.

In operation, variant 56 will operate in the same manner as described above with respect to emitter 1 except that the fluid flowing through discharge outlet 11 will enter passageway 58 and flow into tubing 65. Ultimately, the fluid will be exhausted through outlet 68 of the tubing. Regardless of the diameter of tubing 65, unless it is so small as to create an artifical back pressure which might effect operation of variant 56, the rate of fluid flow is controlled by the above described operation of skirts 33, 34 and orifice 40 forming a part of insert 9.

From tests it has been learned that variant 56 is particularly suited for operation in conduits containing fluid under pressure in the range of 30–70 psig.

As alluded to above, emitter 1 or variant 56 may be mounted within conduit 2 prior to laying the conduit upon or within the ground for irrigation purposes. In the alternative, the conduit may be laid prior to insertion of the emitters and/or variants. In the latter situation, apertures 25 may be punched manually with subsequent insertion of the emitter or variant; or, the aperture and insertion of emitter or variant may be performed with automated or semi-automated machinery.

While the principles of the invention have now been made clear in an illustrative embodiment, there will be immediately obvious to those skilled in the art many modifications of structure, arrangement, proportions, elements, materials and components used in the practice of the invention which are particularly adapted for specific environments and operating requirements without departing from those principles.

I claim:

1. An emitter for discharging fluid from a fluid conveying conduit at a constant rate despite changes in pressure within the conduit, said emitter being penetratingly insertable within an aperture in the wall of the conduit, said emitter comprising:
   a. a cap having a discharge outlet for conveying fluid from within the conduit and through the aperture in the wall of the conduit,
   b. an annular channel disposed about said cap for receivingly engaging the edge of the aperture in the wall of the conduit;
   c. an annular flange disposed adjacent said channel for contactingly engaging the inner wall surface of the conduit adjacent the aperture to maintain said emitter in place,
   d. an insert engageable with said cap and extending from said cap interior to the conduit for providing fluid communication from the interior of the conduit to said discharge outlet, said insert including bias means for maintaining a constant rate of fluid flow through said discharge outlet despite variations in pressure within the conduit and further including a cylindrical shroud penetratingly insertable within said annular cavity for retaining said insert affixed to said cap;

whereby, said emitter is penetratingly mountable within an aperture in the conduit to maintain a constant rate of fluid discharge from the conduit despite variations in fluid pressure within the conduit.

2. The emitter as set forth in claim 1 wherein the junction between said truncated cone shaped surface and said further truncated cone shaped surface defines an apex having a diameter greater than the diameter of said channel.

3. The emitter as set forth in claim 2 wherein said truncated cone shaped surface terminates at an edge generally coincident with the outer cylindrical wall of said annular cavity.

4. The emitter as set forth in claim 2 wherein the diameter of said edge is less than the diameter of said channel.

5. The emitter as set forth in claim 1 including a nozzle extending from said cap for discharging the fluid conveyed through said discharge outlet.

6. The emitter as set forth in claim 5 including tubing means for conveying the fluid and retaining means for receiving said tubing means about said nozzle; whereby, the regulated flow of fluid from said emitter is conveyed to a point distant from the conduit by said tubing means.

7. The emitter as set forth in claim 6 wherein the passageway through said nozzle expands diametrically in the direction of the fluid flow therethrough to avoid back pressure.

8. In a penetrably mounted emitter for discharging fluid through an aperture within the wall of a fluid conveying conduit at a constant flow rate despite changes in pressure within the conduit, the improvement comprising:
   a. a cap insertable within the aperture and having a discharge outlet for conveying fluid from within to without the conduit;
   b. an annular channel disposed about said cap for receivingly engaging the edge of the aperture in the wall of the conduit;
   c. an annular flange disposed adjacent said channel for aiding penetration of said emitter through the aperture and for contactingly engaging the inner wall surface of the conduit adjacent the aperture to maintain said emitter in place, said annular flange including a truncated cone shaped surface for aiding insertion of said cap into the aperture in the wall of the conduit and a further truncated cone shaped surface disposed intermediate said channel and said truncated cone shaped surface; and d. attachment means disposed in said cap for attaching to said cap a fluid pressure sensitive flow regulating insert in fluid communication with said discharge outlet of said cap;

whereby, said cap penetratingly mounts said emitter within an aperture in the wall of the conduit.

9. The improvement as set forth in claim 8 wherein the junction between said truncated cone shaped surface and said further truncated cone shaped surface defines an apex having a diameter greater than the diameter of said channel.

10. The improvement as set forth in claim 9 wherein said annular cavity has an outer cylindrical wall and said truncated cone shaped surface terminates at an edge generally coincident with the outer cylindrical wall of said annular cavity.

11. The improvement as set forth in claim 10 wherein the diameter of said edge of said truncated cone shaped surface is less than the diameter of said channel.

12. The improvement as set forth in claim 9 wherein said cap is of material less flexible than the material of the conduit to promote expansion of the aperture during insertion of the cap and contraction of the aperture into sealing engagement with said channel.

* * * * *

UNITED STATES PATENT AND TRADEMARK OFFICE
CERTIFICATE OF CORRECTION

PATENT NO. : 4,132,364
DATED : January 2, 1979
INVENTOR(S) : Richard C. Harmony

It is certified that error appears in the above-identified patent and that said Letters Patent are hereby corrected as shown below:

Column 7, Claim 1, paragraph (a), line 68, after "conduit", insert --said cap including an annular cavity concentric with said discharge outlet, said annular cavity having an inner and an outer cylindrical wall;--

Column 8, Claim 1, paragraph (c), line 7, after "place" insert --said annular flange including a truncated cone shaped surface for aiding penetration of said cap into the aperture of the conduit and a further truncated cone shaped surface disposed intermediate said channel and said truncated cone shaped surface; and--.

Signed and Sealed this

Nineteenth Day of June 1979

[SEAL]

Attest:

RUTH C. MASON
Attesting Officer

DONALD W. BANNER
Commissioner of Patents and Trademarks